G. BLUEMEL.
METHOD OF AND MEANS FOR ENERGIZING ELECTRIC GENERATORS.
APPLICATION FILED MAY 21, 1914.
1,199,341.
Patented Sept. 26, 1916.
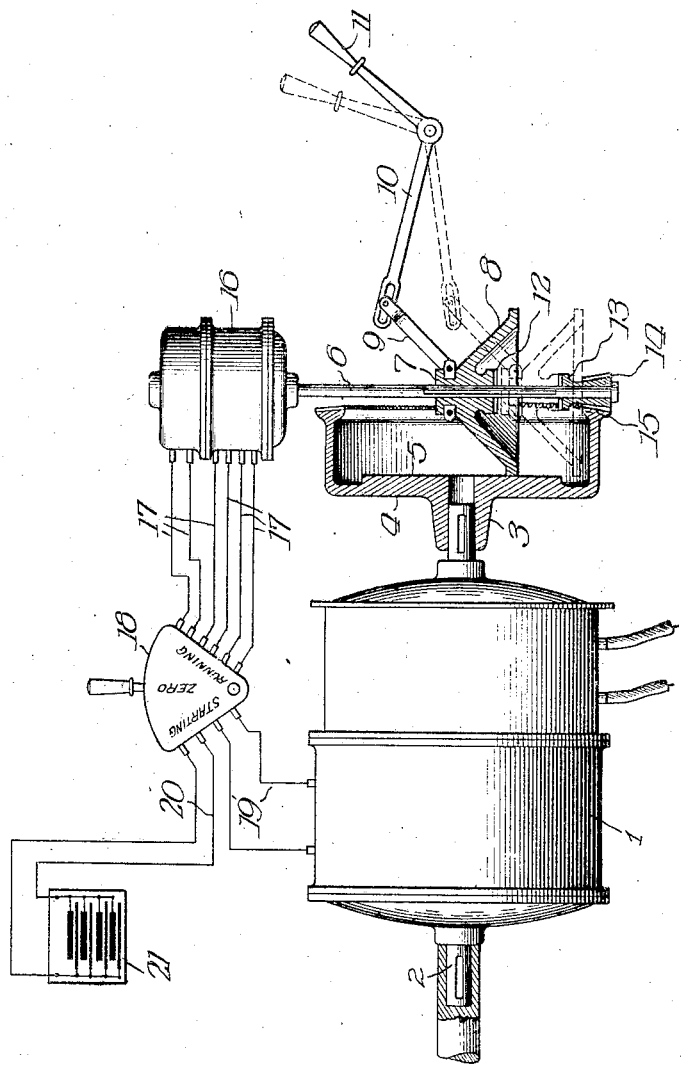

UNITED STATES PATENT OFFICE.

GUSTAVE BLUEMEL, OF CHICAGO, ILLINOIS, ASSIGNOR OF ONE-HALF TO WILLIAM M. SIMPSON, OF CHICAGO, ILLINOIS.

METHOD OF AND MEANS FOR ENERGIZING ELECTRIC GENERATORS.

1,199,341.          Specification of Letters Patent.          Patented Sept. 26, 1916.

Application filed May 21, 1914. Serial No. 839,921.

*To all whom it may concern:*

Be it known that I, GUSTAVE BLUEMEL, a subject of the Emperor of Austria-Hungary, residing at Chicago, in the county of Cook and State of Illinois, have invented certain new and useful Improvements in Methods of and Means for Energizing Electric Generators, of which the following is a specification.

My invention relates in general to a method of and means for energizing electric generators in which the field magnets are energized from an outside source.

The field coils or generators have heretofore been energized by three distinct methods. According to the first method, known as series winding, one of the main wires from the brushes is carried around the magnets. The second method, known as shunt-winding, necessitates the use of a wire called a shunt which is attached at either end to the opposite brushes and carries a portion of the current around the magnets to energize the same. The third method involves the use of a smaller generator which is commonly mounted on and directly connected to the main shaft of the main generator, so that the armature of the smaller generator revolves therewith. The wires from the brushes of the smaller generator pass around the field magnets of the main generator and the current from the smaller generator energizes the magnets of the main generator. It is to this latter class of generating apparatus and the method of operating the same that my invention specifically relates.

In order that the generator may pick up quickly and deliver its full capacity in the shortest possible time it is necessary that the field magnets should be saturated as soon as possible after the main shaft begins to rotate. Where, however, the exciting generator is directly connected to the shaft it is obvious that the current produced by the exciting generator will depend wholly upon the speed of the shaft and to saturate the field coils of the main generator it will be necessary to rotate the shaft at a high rate of speed. It is not desirable, however, to unduly increase the speed of the main shaft in starting the apparatus and hence such a system will not deliver its full capacity for some time after the apparatus is set in motion. My invention overcomes this difficulty by providing a variable speed transmission for connecting the exciting generator to the shaft of the main generator and a method of operating the system, whereby the operator is in complete control of the speed at which the exciting generator is driven and hence is enabled to cause the same to run at such a speed while the main generator is being started that the field magnets are quickly saturated. Under these conditions the main generator will pick up rapidly and will deliver a maximum quantity of current in the shortest possible time.

My invention further relates to an arrangement of the exciting generator and transmission whereby the said generator may be used as a motor to start the apparatus when, for example, the main shaft is driven by an internal combustion engine.

Further objects of my invention will appear from the reading of the annexed specification and by reference to the drawing on which the figure represents the invention somewhat diagrammatically, the transmission being shown in cross-section.

Referring to the drawing, 1 indicates the main generator which is provided with a main shaft 2 connected to a suitable source of power, preferably an internal combustion engine (not shown). To the opposite end of the shaft 2 a hub 3 is keyed having a flange 4 integral therewith which is provided on its outer face with a friction surface 5. Suitably mounted adjacent to the friction surface 5 is a shaft 6 on which is mounted a hub 7 carrying a friction disk 8, said hub being keyed to the shaft in such a manner that it may slide upon the same. An arm 9 is attached to the hub and a bell-crank lever 10 having a handle 11 is mounted adjacent thereto and connected to said arm, and may be used to slide the hub 7 and friction disk 8 upon the shaft 6. The hub 7 carries also a clutch 12 which is adapted to engage the clutch member 13 which is loosely mounted on the shaft 6 and has a bevel pinion 14 formed integral therewith. The bevel pinion is adapted to engage a bevel gear 15 formed upon the flange 4 when the hub 7 is moved by means of the bell-crank lever 10 in the position shown in dotted lines on the drawing.

An exciting generator 16 is directly connected to the shaft 6. This exciting generator is of the type which may be used at will to generate current when driven by the shaft 6 or may be used to drive the shaft 6 when current is supplied from a suitable source. Suitable electrical connections 17 are provided between the exciting generator 16 and a two-way switch 18 and electrical connections 19 and 20 are provided between the switch 18 and the main generator 1 and a suitable source of electrical current 21 such as a storage battery, respectively.

The mode of operation of the apparatus is as follows: The shaft 2 being at rest, it is necessary if an internal combustion engine is used as a source of power to first turn said shaft until the engine begins to explode the charges in its cylinders and to accomplish this result the exciting generator 16 may be used as a motor. To start the apparatus the hub 7 is moved by means of the bell-crank lever 10 to the position shown in the dotted lines on the drawing at which position the friction disk 8 disengages the friction surface 5 and the clutch 12 engages the clutch 13. The handle of the switch 18 being now moved to the starting position connections are established from the source of current 21 through the connections 20 and 17 to the exciting generator 16 which acts in this connection as a motor. Power is transmitted through the shaft 6, clutch members 12 and 13, bevel pinion 14, bevel gear 15 and hub 3 to the main shaft 2 and thence to the engine. As soon as the engine is properly started the handle of the switch 18 is moved to running position, whereby electrical connections are established between the brushes of the exciting generator 16 and the field coils of the main generator 1 and current is supplied from the exciting generator 16 to said coils and the hub 7 is moved by means of the bell-crank lever 10 to disengage clutch members 12 and 13 and to move the friction disk 8 into contact with the friction surface 5.

One of the objects of my invention is to provide a method and means of regulating the speed of the exciting generator 16 to supply sufficient current to the field coils to thoroughly saturate the magnets as soon as the main generator has been started. This is accomplished through the medium of the friction driving means 5 and 8 and the bell-crank lever 10, whereby the friction disk 8 may be moved to any position with relation to the friction surface 5. It is obvious that by operating the bell-crank lever 10 the ratios between the friction surface 5 and the friction disk 8 may be so varied that the speed of the shaft 6 and hence of the exciting generator 16 may be varied at will and so that the exciting generator 16 will supply a maximum quantity of current to the field coils even though the main shaft 2 may be revolving at a relatively low speed. By this means it is possible for the operator to regulate the apparatus so that the field magnets are fully saturated at an early stage in the starting operation and the main generator will accordingly pick up very rapidly and will be operating at its maximum efficiency in a relatively short time.

It will be apparent that various changes may be made in the form, construction and arrangement of the parts without departing from the spirit and scope of the invention or sacrificing any of its material advantages, the form hereinbefore described being merely a preferred embodiment thereof.

I claim:

1. A method of energizing electric generators which consists in driving a main generator and an auxiliary exciting generator from a constant source of power, supplying current to the energizing coils of said main generator and from said auxiliary generator, and varying the speed of said auxiliary generator at will independently of the speed of said main generator to vary the amount of current flowing to said energizing coils without affecting the speed of said main generator.

2. In an apparatus of the character described, the combination of a main generator driven from a constant source of power, an auxiliary exciting generator connected thereto and adapted to be driven when the main generator is in operation, and means for varying at will the speed of said auxiliary generator without affecting the speed of said main generator.

3. In an apparatus of the character described, the combination of a main generator driven from a constant source of power, an auxiliary exciting generator connected thereto and adapted to be driven when the main generator is in operation, and manually controllable means for varying at will the speed of the auxiliary generator without affecting the speed of the main generator.

4. In an apparatus of the character described, the combination of a main generator, an auxiliary exciting generator, and means for simultaneously driving said generators from a constant source of power, including a friction-driving connection, whereby the speed of said auxiliary generator may be varied at will independently of and without affecting the speed of said main generator.

5. In an apparatus of the character described, the combination of a main generator, an auxiliary exciting generator, a shaft for the main generator, an internal combustion engine connected to said shaft, a friction disk on said shaft, and means slidably mounted in engagement therewith and operable at will for transmitting power from the main generator shaft at variable speeds to the auxiliary generator without affecting the speed of the main generator.

6. In an apparatus of the character described, the combination of a main generator, an auxiliary exciting generator, a shaft for the main generator, an internal combustion engine connected to said shaft, and means operable at will for transmitting power at variable speeds from the main generator shaft to said auxiliary generator without affecting the speed of said main generator, comprising a friction disk mounted on said shaft, a second friction disk slidably mounted in engagement therewith, and means for transmitting power from said second friction disk to the auxiliary generator.

7. In an apparatus of the character described, the combination of a main generator, a shaft connected thereto, a dynamo adapted to operate as a motor or generator arranged in operative relation to said shaft, means for connecting said main generator and dynamo, whereby the latter may be alternatively operated as a motor to drive the shaft or as a generator to furnish current to the energizing coils of the main generator, and means controllable at will for regulating the speed of said dynamo when the latter is used to furnish current to the energizing coils of the main generator.

8. In an apparatus of the character described, the combination of a main generator, a dynamo adapted to operate as a motor or generator, a shaft connected thereto, a flanged member, having a friction surface and carrying a bevel gear, mounted on said shaft, a shaft mounted adjacent said flanged member and connected to said dynamo, a friction disk slidably mounted on said last-mentioned shaft and provided with a clutch member, a bevel pinion loosely mounted on said last-mentioned shaft and also provided with a clutch member, and means for varying at will the position of the friction disk on the shaft, whereby the relative speeds of said dynamo and main generator may be varied.

GUSTAVE BLUEMEL.

Witnesses:
 ERNEST H. MERCHANT,
 M. A. KIDDIE.